United States Patent [19]
Buhler et al.

[11] Patent Number: 5,584,762
[45] Date of Patent: Dec. 17, 1996

[54] APPARATUS AND METHOD FOR COMPACTING COTTON MATERIALS IN A BASKET

[75] Inventors: Timothy D. Buhler, Rock Island; Dale W. Panoushek, Orion; Lindy M. Tribbett, Moline; Michael J. Covington, La Grange, all of Ill.

[73] Assignee: Case Corporation, Racine, Wis.

[21] Appl. No.: 493,583

[22] Filed: Jun. 22, 1995

[51] Int. Cl.$^6$ ................................................. A01D 46/08
[52] U.S. Cl. .......................... 460/119; 56/16.4 R; 56/16.6
[58] Field of Search ...................................... 460/119, 114, 460/116; 56/28, 30, 16.4, 16.6

[56]  References Cited

U.S. PATENT DOCUMENTS

| | | | |
|---|---|---|---|
| 4,553,378 | 11/1985 | Fachini et al. | 56/16.6 |
| 4,888,940 | 12/1989 | Deutsch | 56/16.6 |
| 4,930,297 | 6/1990 | Schlueter | 56/16.6 |
| 4,958,756 | 9/1990 | Conway | 222/164 |
| 5,343,679 | 9/1994 | Cymara | 56/16.6 |

Primary Examiner—Terry Lee Melius
Attorney, Agent, or Firm—Rudnick & Wolfe

[57] ABSTRACT

A cotton compacting assembly arranged in combination with a basket or receptacle that receives and holds cotton materials harvested by a cotton harvester. The cotton compacting assembly compacts the relatively light and fluffy cotton materials in the basket to increase the maximum capacity of the basket without increasing the size of the receptacle or basket. The cotton compacting assembly includes a frame mounted for movement in the basket. A powered rotatable member is mounted on and movable with the frame for imparting movements to the cotton materials in the basket. A control circuit automatically moves the frame to compact cotton materials in the basket in response to a predetermined increase in the power requirements of the rotatable member. The control circuit further includes an apparatus for indicating the level of harvested cotton materials in the basket.

34 Claims, 4 Drawing Sheets

APPARATUS AND METHOD FOR COMPACTING COTTON MATERIALS IN A BASKET

FIELD OF THE INVENTION

The present invention generally relates to cotton harvesters and, more particularly, to compacting structure arranged in a cotton receiving basket to increase basket capacity without increasing actual basket size. A method of filling a basket of a cotton harvester is also disclosed.

BACKGROUND OF THE INVENTION

Cotton harvesters typically include harvesting structure mounted at a front or forward end of the cotton harvester for harvesting cotton materials from rows of cotton plants as the harvester is driven across the field. To increase harvesting capacity, additional row units have been added to the harvesting structure across the front of the harvester.

Modem high capacity cotton harvesters are typically very large structures and include a high volume or capacity basket. Although the baskets of modem cotton harvesters have been increased, such increases in basket size have been offset by the supplementation of additional harvesting units and, thus, harvesting capacity of the machine. Thus, the increased size of the basket on harvesters still required frequent emptying or dumping during the harvesting operation.

To arrange the harvested cotton materials as they are introduced into the basket, some cotton harvesters include one or more rotatable members that are configured as augers within the basket. Such augers are typically arranged toward a top of the basket to engage the harvested cotton materials as they are introduced into the basket. The turning movement of the auger tends to move the harvested cotton materials away from the inlet opening through which the cotton materials are introduced to the basket.

As will be appreciated by those skilled in the art, during a harvesting procedure, the operator has a myriad of tasks and duties to perform. Accordingly, it is not uncommon for the level of harvested cotton materials in the basket to quickly rise and completely fill the basket. On occasion, the level of harvested cotton materials in the basket rises to a level that the power required to drivingly rotate the augers is significantly increased. At times, the level of cotton in the basket rises to such a level that the power driven motor provided for turning the augers stalls thus resulting in possible damage to the auger or motor.

Discharging or dumping of cotton materials from the basket is a time consuming task that steals away from the efficiency and effectiveness of the cotton harvester. Still further increases to the size of the basket does not appear to be an available option to solve the problem. Further increases to the basket size are likely to adversely affect the transportability of the harvester across rows and fields. Also, and as will be appreciated, power lines as well as sized openings in barns, buildings and the like through which the harvester is driven limit further increases to the basket size.

Thus, there remains and need a desire for an improved method and apparatus for filling a cotton receiving basket to increase the total capacity thereof without increasing the size of the basket.

SUMMARY OF THE INVENTION

In view of the above, and in accordance with the present invention, there is provided a cotton compacting structure arranged in combination with a cotton receiving basket. The cotton compacting structure of the present invention compacts the relatively light and fluffy cotton materials directed and blown into the basket to increase the maximum capacity of the basket without increasing basket size. The cotton compacting structure of the present invention includes a frame preferably mounted for vertical movement in the basket. A powered rotatable member is mounted on and movable with the frame for imparting movements to the cotton materials in the basket. A control circuit automatically moves the frame to compact harvested cotton materials in the basket in response to a predetermined increase in the power requirements of the rotatable member.

In the illustrated embodiment of the invention, the basket is arranged on a frame of a cotton harvester that includes cotton conveying duct structure for blowing harvested cotton materials into the basket in a predetermined direction. The basket is preferably configured with a top wall, a floor, and sidewalls that extend between the top wall and floor. As is conventional, the basket further includes a door through which cotton materials are discharged from the basket. A cotton conveyor preferably operates in combination with the door for forcibly discharging cotton materials from the basket. In a most preferred form of the invention, the basket is comprised of upper and lower basket portions. The upper basket portion is elevationally movable relative to the lower basket portion thereby increasing the capacity of the basket.

The frame of the compacting structure is movable between a retracted position and an extended position. In a retracted position, the frame of the compacting structure is arranged generally parallel to and adjacent the top wall of the basket. In such position, the axes of the rotatable members mounted in the frame extend generally parallel to the predetermined direction in which cotton is blown into the basket.

In a preferred form of the invention, the compacting structure further includes structure for pivotally connecting the frame to the basket for pivotal movement about a generally horizontal axis. In the most preferred form of the invention, the frame is mounted for pivotal movement about an axis arranged toward a rear of the basket or receptacle. A driver is provided for moving the frame, along with a rotatable members carried thereon, between the retracted position and toward an extended position. The driver for moving the compacting structure preferably includes a linearly distendable hydraulic cylinder.

Each powered rotatable member or auger on the frame is individually driven by a motor. Preferably, a source of hydraulic fluid pressure is connected to a series of motor serving to impart rotation to the augers independently of the movement of the frame assembly.

The control circuitry associated with the compacting structure preferably comprises electro/hydraulic structure including valve assemblies operably connected between a source of fluid pressure and the auger and compacting frame drivers. The valves are selectively operated to effect the desired performance of the compacting structure.

In a preferred form, the control circuitry includes a selectively operated switch for conditioning the compacting structure for operation in either an automatic mode or a manual mode. When the control circuitry is set in an automatic mode, the frame of the compacting structure moves in response to power requirements of the drivers or motors used to rotatably drive the augers. When the control system of the cotton compacting structure is set in a manual mode, the cotton compacting frame is moved in response to manual manipulation of the switch.

In a most preferred form of the invention, the circuitry further includes a second switch which allows for conjoint operation of the cotton conveyor and the auger exclusive of the cotton compacting frame to facilitate the discharge of harvested cotton materials from the basket. The control circuitry may further include an apparatus for cyclically controlling movements of the frame inside the basket assembly. Furthermore, the control circuit may include an apparatus for indicating the height of harvested cotton materials in the basket assembly.

The present invention further discloses a method of filling a cotton material receiving basket arranged in combination with a cotton harvester. The preferred method includes the steps of: driving an auger about a rotatably axis to move cotton materials within the basket; and, moving a cotton compacting structure on which the auger is rotatably mounted automatically between a retracted position and an extended position in response to power requirements used to rotate the auger about its axis of rotation. The method according to the present invention may further include the step of sensing the power requirements used to rotate the auger about its rotational axis. The method according to the present invention may include the further step of moving the compacting structure between a retracted position and an extended position in response to manual manipulation of a switch. Furthermore, the method according to the present invention may include the further step of mounting the cotton compacting structure for pivotal movement about a fixed generally horizontal axis. An enhanced method of filling the basket further includes the step of sensing the level of harvested cotton materials in the basket and operating the cotton compacting structure as a function thereof.

The compacting structure of the present invention provides several benefits. With the compacting structure arranged in its retracted position, the rotary augers engage and impel harvested cotton materials directed into the basket away from the outlet opening of the cotton conveying structure thereby clearing the opening for introduction of further harvested cotton materials into the basket. Advantageously, the frame of the cotton compacting structure is automatically moved to compact the harvested cotton materials in the basket in response to a predetermined increase in the power requirements of the rotatably augers. By compacting the harvested cotton materials within the basket, the static cotton materials in the basket are removed from the augers thereby reducing the power requirements to turn the augers. Alternatively, the frame of the cotton compacting structure can be manually operated at will to compact the harvested cotton materials in the basket. The cotton compacting structure is preferably provided with an indicator for alerting the operator to the compacted level of harvested cotton materials in the basket. Notably, the rotating action of the augers is independent of the elevational movement of the frame within the basket structure. Moreover, with the present invention, the augers on the compacting structure can be conjointly operated with the cotton conveyor in the basket exclusive of vertical movements of the compacting frame to facilitate the discharge of harvested cotton materials from the basket. Since the compacting action on the cotton materials increases the basket capacity, the frequency of dumping is reduced and, thus, the productivity of the harvester is significantly enhanced.

Numerous other features and advantages of the present invention will become readily apparent from the following description of the drawings, the detailed description, and the appended claims.

DETAILED DESCRIPTION OF THE PRESENT INVENTION

Figure 1:
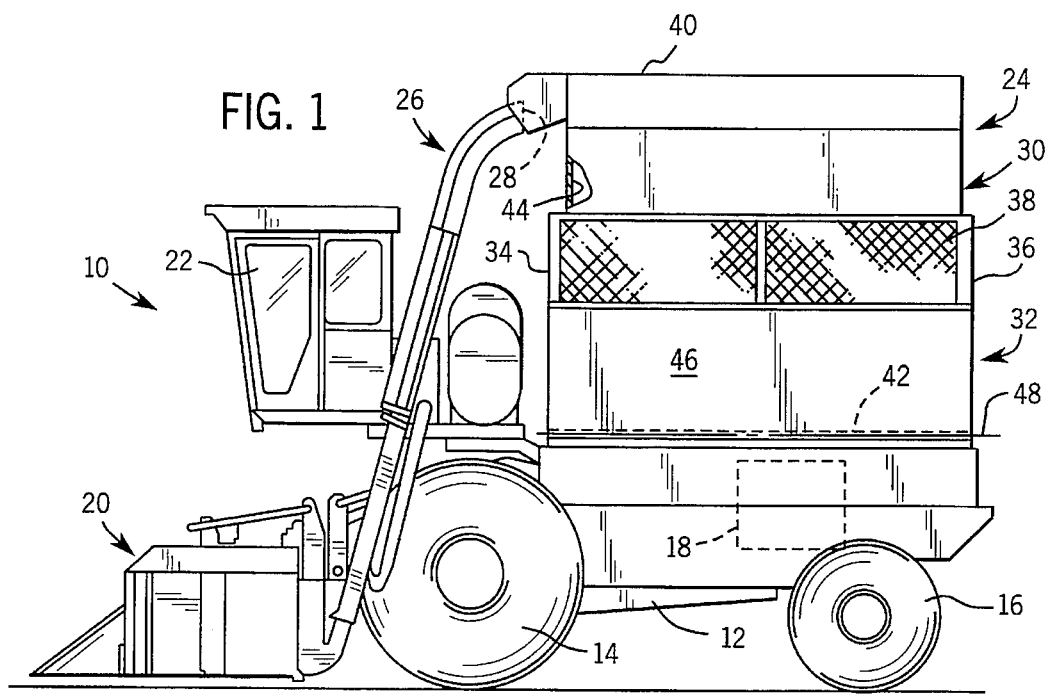
FIG. 1 is a schematic side elevational view of a cotton harvester with a basket assembly embodying a cotton compacting structure according to the present invention.

While the present invention is susceptible of embodiment in various forms, there is shown in the drawings, and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals refer to like parts throughout the several views, in FIG. 1 there is generally indicated by reference numeral 10 a cotton harvester which is preferably of the type sold by Case Corporation of Racine, Wis. under model number 2155. The cotton harvester 10 is a self propelled machine having a fore-and-aft extending frame 12 supporting for movement over the ground by a pair of front drive wheels 14 and a pair of rear steerable wheels 16. Power is provided to the harvester 10 and the various instrumentalities provided thereon by a conventional internal combustion engine 18 mounted to the frame 12 and that forms part of a conventional power train assembly. Harvesting structure, generally indicated by reference numeral 20 is provided at a forward or front end of the frame 12 of the harvester 10. Suffice it to say, the harvesting structure 20 comprises of plurality of cotton material picking or stripping row units mounted in side-by-side relation across a forward end of the harvester. A cab region or operator station 22 is supported on the frame 12 rearwardly and above the harvesting structure 20.

Harvester 10 further includes a relatively large basket assembly 24 that is also preferably supported on the frame 12 rearwardly of the cab region 22. A cotton material conveying duct structure, indicated generally by reference numeral 26, extends from the harvesting structure 20 to an upper forward portion of the basket assembly 24. As is conventional, the duct structure 26 defines an outlet opening 28 at an upper end thereof through which harvested cotton materials are blown and directed into the basket assembly 24 in a predetermined direction.

In the illustrated form of the invention, the basket assembly 24 comprises upper and lower basket portions 30 and 32, respectively. The upper basket portion 30 is elevationally movable within and relative to the lower basket portion 32 for movement between a lowered transport or storage position and a raised or field working position under the influence of suitable hydraulic drivers (not shown). As is conventional, the basket assembly 24 can be elevated relative to the frame 12 of the harvester to facilitate emptying or dumping of the harvested cotton materials from the basket 24.

It should be appreciated, however, that the exact structure of the basket assembly 24 is not essential to the present invention and whereas the present invention is equally applicable to and readily suited for other forms of basket assemblies which do not include upper and lower basket portions. Suffice it to say, the basket assembly 24 includes a front wall 34, a rear wall 36, and opposed sidewalls 38 that vertically extend between a top wall 40 and a floor or bottom wall 42. The walls of the basket assembly combined with each other to define walled enclosure 44 wherein cotton harvested materials are received and stored.

Figure 2:
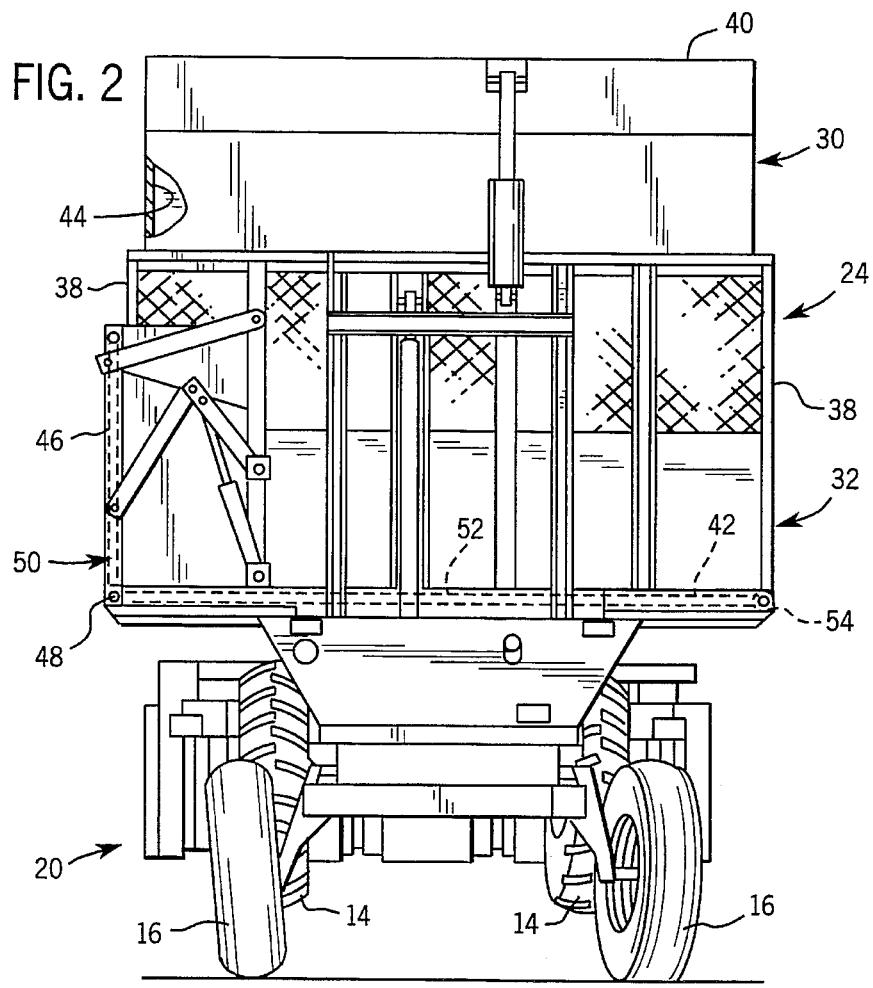
FIG. 2 is a schematic rear elevational view of the cotton harvester illustrated in FIG. 1.

As shown in FIGS. 1 and 2, the basket assembly 24 further includes a door 46 through which harvested cotton materials are discharged from the receptacle 24. As is conventional, the door 46 is moved between open and closed positions about a generally horizontal axis 48. In the illustrated embodiment, the door axis 48 is arranged such that the door 46 is generally co-planar with the floor 42 of the receptacle 24 when in its open position to promote the discharge of the harvested cotton materials from the receptacle 24.

To promote the discharge of harvested cotton materials therefrom, the receptacle or basket assembly 24 is preferably further provided with a conveyor assembly 50. The conveyor assembly 50 preferably includes a conventional chain and slat conveyor 52. In the illustrated form of the invention, the chain and slat conveyor 52 is driven by a conventional hydraulic conveyor motor assembly 54. In a most preferred embodiment, the conveyor assembly 50 extends across the floor 42 of the basket assembly 24 and preferably forms at least a portion of the door 46. Thus, when the door 46 is in its open position, door 46 and floor 42 provide a generally co-planar movable surface. Accordingly, harvested cotton materials are removed from the basket assembly 24 by the conveyor assembly 50, across the floor 42, and over the door 46 without a hinderance.

Figure 3:
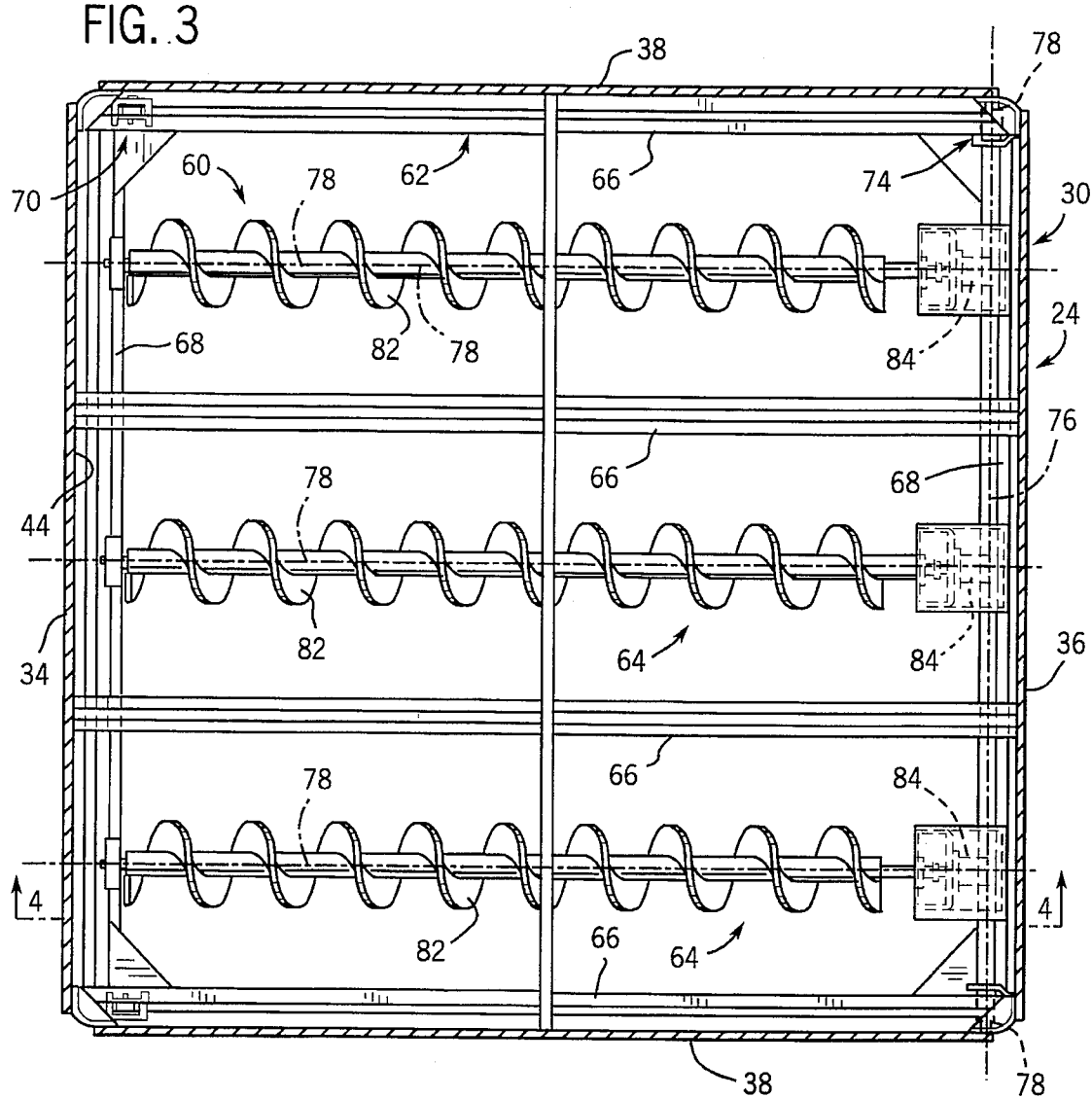
FIG. 3 is an enlarged longitudinal sectional view of an upper end of the basket assembly having the compacting structure of the present invention mounted therein.
Figure 4:
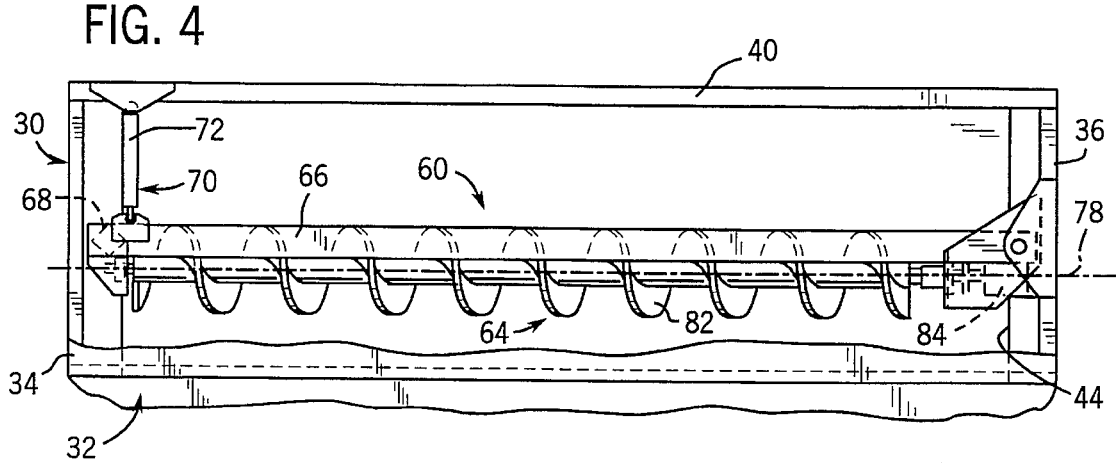
FIG. 4 is a sectional view taken along line 4—4 of FIG. 3.

To increase capacity of the basket assembly 24 without increasing basket size, a cotton compacting structure or assembly, generally indicated in FIGS. 3 and 4 by reference numeral 60, is mounted within the basket assembly 24. In the illustrated embodiment, the compacting structure 60 includes a cotton compacting frame 62 and one or more members 64 that are rotatably mounted on and movable width the frame 62.

The cotton compacting frame 62 preferably has a vertical component of movement within the enclosure 44 defined by the walls 34, 36 and 38 of the basket assembly 24. In the illustrated embodiment, the compacting frame 62 has a generally rectangular configuration that is concentric with the enclosure 44 of the basket assembly 24 and is preferably comprised for the plurality of rigid transversely spaced and elongated frame members 66 that are rigidly joined to each other adjacent their ends by rigid transverse frame members 68. Notably, the frame members 66 of the compacting frame 62 are arranged parallel to the rotational axis and on opposite sides of each rotatable member 64. To lessen the weight of the frame 62, frame members 66 and 68 preferable have a hollow configuration along their lengths.

The cotton compacting frame 62 is movable on-the-go between a retracted position and an extended position under the influence of a driver 70. As shown in FIG. 4, in its retracted position, the cotton compacting frame 62 is arranged generally parallel and proximate to the lid or top wall 40 of the basket assembly 24. In its extended position, the frame 62 is moved toward the floor 42 (FIG. 1) of the basket assembly 24. Driver 70 preferably includes a linearly distendable double acting hydraulic cylinder 72 that has sufficient stroke to move the frame 62 between extended and retracted positions.

In a preferred form of the invention, the cotton compacting structure 60 further includes structure 74 (FIG. 3) for mounting the cotton compacting frame 62 for generally pivotal movement between its retracted and extended positions within the enclosure 44 defined by the receptacle or basket assembly 24. As shown in FIG. 3, structure 74 preferably mounts the compacting frame 62 for pivotal movement about a generally horizontal transverse axis 76 arranged toward a rear end of the basket assembly 24. In a most preferred formed, structure 74 includes a pair of axially aligned stub shafts 78 about which the frame 62 pivots between retracted and extended positions. As shown in FIGS. 3 and 4, the driver 70 for frame 62 is preferably connected at the end of that frame 62 opposite from the pivot axis 76.

Each rotatable member 64 of the compacting structure 60 is preferably mounted for rotation about a fore-and-aft extending axis 78 that extends generally parallel to the direction that the cotton materials are blown into the basket assembly 24 from the cotton conveying ducts 26 (FIG. 1). As shown, each rotatable member 64 has an auger-like configuration including a series of auger flights 82 for engaging an imparting movement to the harvested cotton materials in the basket assembly 24. In the preferred form of the invention, each auger or rotating member 64 is driven by a hydraulic motor 84 that is mounted on and for movement with the cotton compacting frame 62. In the illustrated embodiment of the invention, the hydraulic motors 84 for driving the augers 64 are connected in series relative to each other and are preferably operated independent of the driver 70 that moves the cotton compacting frame 62 within the enclosure 44 of the basket assembly 24. It should be appreciated, however, that the present invention is equally applicable to other motors for driving the augers 64 and other driving arrangements for moving the cotton compacting frame 62 from that illustrated without detracting or departing from the spirit and scope of the present invention.

Figure 5:
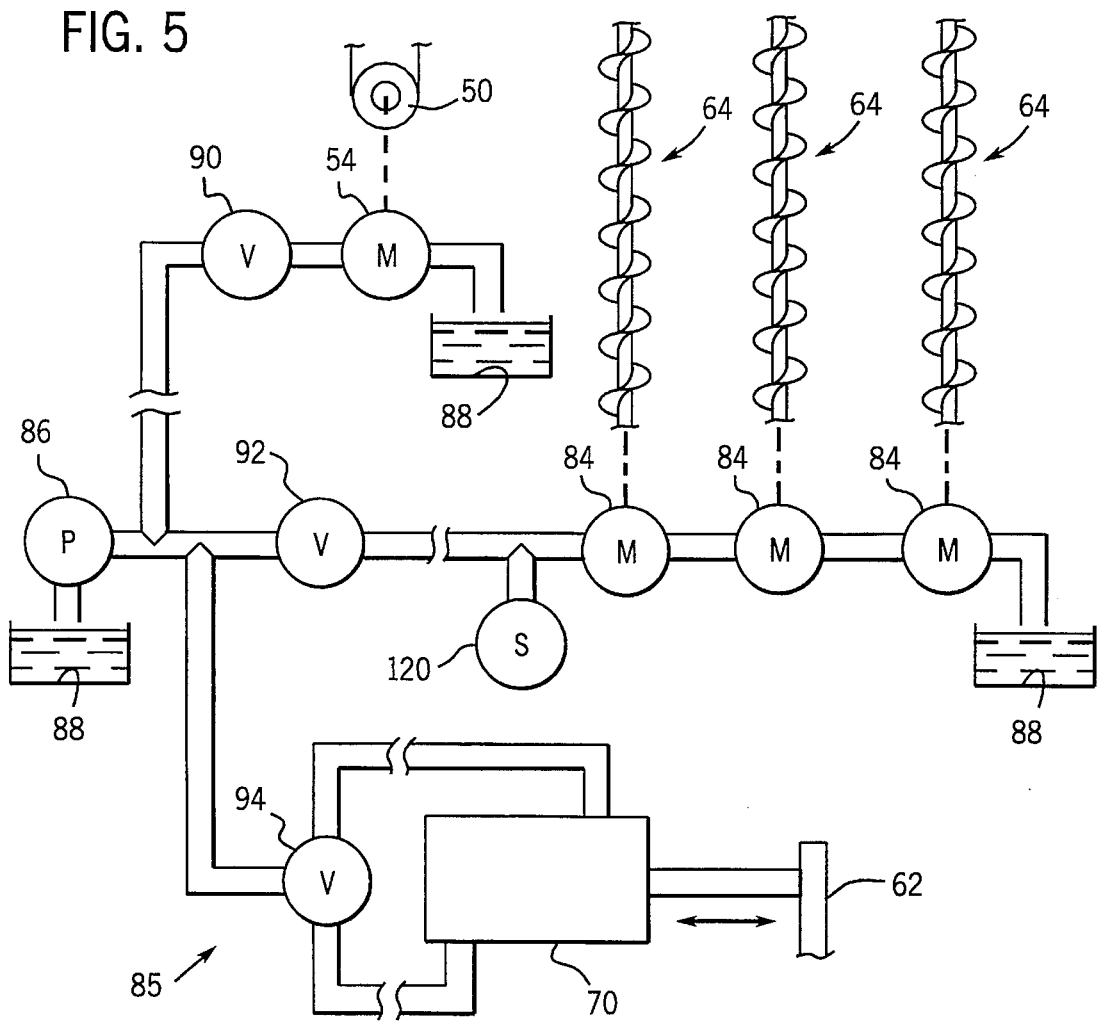
FIG. 5 is a schematic diagram of the hydraulic circuitry associated with the present invention; any

Turning now to FIG. 5, one form of hydraulic circuitry 85 is schematically illustrated for operating the cotton compacting structure including the drivers 84 for the rotatable augers 64, the driver 70 for the cotton compacting frame 62, and the driver or motor 54 for the conveyor assembly 50. The circuitry 85 includes a source of pressurized hydraulic fluid 86 and a reservoir 88 typically located on the frame 12 of a cotton harvester 10. The source of fluid pressure 86 is interconnected, through suitable conduits, to the conveyor assembly driver 54 through a valve 90, to the auger motors 84 through a valve 92, and to the cotton compacting frame driver 70 through a valve 94. In a most preferred form of the invention, valves 90, 92 and 94 are configured as electrically operated solenoid valves 92.

Figure 6:
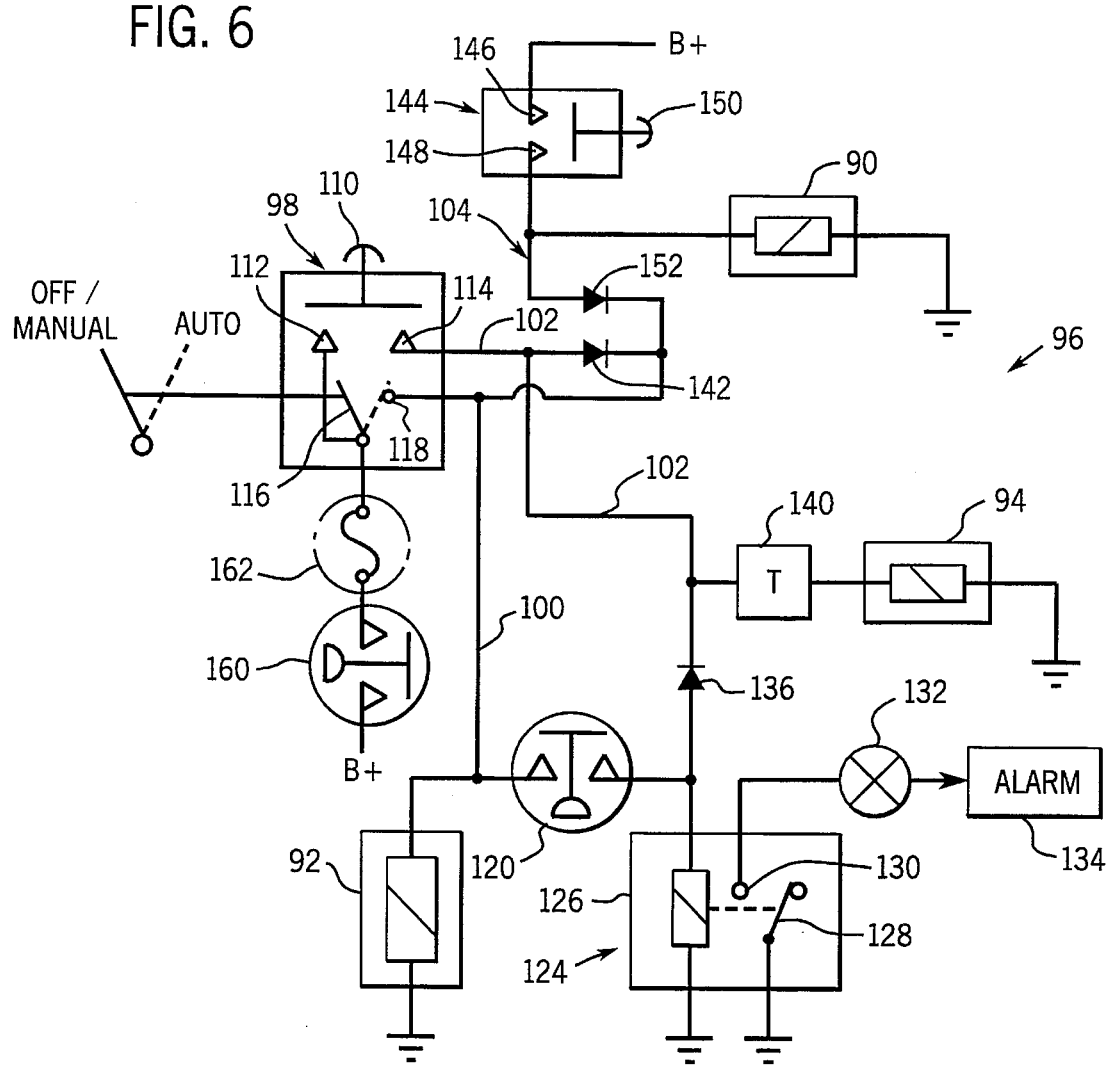
FIG. 6 is a schematic diagram of a control system for controlling operation of the compacting structure of the present invention.

Referring now to FIG. 6, a control system, generally indicated by reference numeral 96, is schematically shown as being arranged in combination with valves 90, 92 and 94 of the hydraulic circuitry 85 for selectively controlling operation of the cotton compacting assembly 60 and, preferably the conveyor assembly 50 of the basket assembly 24. The control system 96 includes a manually operated switch 98 preferably arranged in the cab region 22 (FIG. 1) of the harvester 10. Switch 98 is connected to a suitable electrical power source B+ such as a battery (not shown) on the harvester. As shown, an auger enable circuit 100 interconnects the auger valve 92 with switch 98. A compactor frame enable circuit 102 interconnects the compactor frame valve 94 with switch 98. A conveyor assembly enable circuit 104 interconnects the conveyor assembly valve 90 to the auger valve 92.

In a most preferred form of the invention, switch 98 includes a momentary plunger 110. Plunger 110 of switch 98 moves elevationally or linerally in response to the operator pushing down thereon. Plunger 110 of switch 98 likewise rotates in response to suitable operator manipulation. As will be appreciated, other types of switches could be substituted for that described above without detracting or departing from the spirit and scope of the present invention.

In the illustrated embodiment, switch 98 includes contacts 112 and 114. Contact 112 is connected to the power source B+ and contact 114 is connected to the compactor frame enable circuit 102. Switch 98 likewise includes a movable contact 116 that is responsive to turning movement of the plunger 110. Contact 116 is connected to the power source B+. Switch 98 is furthermore provided with a contact 118 connected to the auger enable circuit 100. As shown, switch 98 can be conditioned in either a manual position, wherein the plunger 110 and movable contact 116 are in the position shown in FIG. 6, or an automatic position, wherein the movable contact 116 connects the battery source to contact 118.

As shown in FIG. 6, the auger enable circuit 100 is operably interconnected to the compactor frame enable circuit 102 as through a sensor 120. The purpose of sensor 120 is to monitor the power requirements of the motors 84 used to rotate the rotatable members or augers 64. As shown in FIG. 5, in a most preferred form of the invention, sensor 120 is operably disposed in the hydraulic conduit leading to the auger motors 84. In the illustrated embodiment, the purpose of sensor 120 is to monitor or detect the hydraulic pressure required to rotate the augers 64. The sensor 120 is movable between open and closed positions. As long as the fluid pressure provided to the motors 84 is below a predetermined value, sensor 120 remains open. When the power requirements, however, of the augers 64 increases, resulting from the harvested cotton materials impinging against the flights 82, the fluid pressure in the hydraulic circuit leading to the motors 84 likewise increases. The sensor 120 detects this increase in hydraulic pressure and moves to a closed position when that hydraulic pressure exceeds a predetermined value. In the preferred form of the invention, sensor 120 effectively closes when the hydraulic pressure in the circuitry leading to the motors 84 ranges between about 1,000 psi and about 1,500 psi. In a most preferred form of the invention, sensor 120 closes in response to a pressure level of about 1,050 psi.

Preferably, the auger enable circuit 100 of the control system 96 further includes an apparatus 124 for indicating the level of harvested cotton materials in the receptacle 24. As shown in FIG. 6, the indicator apparatus 124 is preferably disposed in series with the sensor 120. The indicator apparatus 124 preferably includes a relay 126 having a movable contract 128 that is connected to ground and a normally open contact 130. The normally open contact 130 is connected to a visual indicator or lamp 132 preferably arranged in the cab region 22 (FIG. 1) of the harvester 10. The normally open contact 130 is likewise connected to an audible indicator or alarm 134 likewise arranged in the cab region 22 (FIG. 1) of the harvester 10. A blocking diode 136 isolates the indicator apparatus 124 from the compactor frame enable circuit 102.

For purposes of this description, one "cycle" of the cotton compacting frame assembly 60 means one downward movement of frame 62 from its retracted position toward the floor 42 of the receptacle 24 consecutively followed by one upward movement of frame 62 toward its retracted position. In the illustrated embodiment of the invention, the compactor frame enable circuit 102 includes a compactor module or timer 140 operably disposed between the cotton compacting frame valve 94 and switch 98. The module or timer 140 controls the time it takes for the cotton compacting frame assembly 60 to move through one cycle of operation. That is, the control module or timer 140 controls the amount of time it takes for the frame 62 to move down from its retracted position and then the time it takes for the frame 62 to return to its retracted position. A blocking diode 142 isolates the module or timer 140 and cotton compacting frame valve 94 from contact 118 of switch 98.

The conveyor assembly enable circuit 104 includes a manually operated switch 144 having contacts 146 and 148. Contact 148 of switch 144 is connected to the electrical power source B+ on the harvester 10. Contact 148 of switch 144 is connected to the conveyor assembly enable circuit 104. A manually operable plunger 150 or other suitable actuator is likewise included with switch 144. Normally, the actuator 150 is disposed in the open state shown in FIG. 6. Notably, a blocking diode 152 isolates the conveyor assembly enable circuit 104 from switch 98.

In a most preferred form of the invention, the control system 96 is enabled only after the harvester 10 is prepared for field operation. In the illustrated embodiment, a sensor 160 is disposed between the power source B+ and the switch 98. In a most preferred form of the invention, the purpose of sensor 160 is to monitor the oil pressure of engine 18. When the harvester is set to operate, and the engine 18 is running, sensor 160 closes thereby enabling the control system 96. Of course, when engine 18 is shut off, the sensor 160 opens thereby disabling the control circuitry 96. Moreover, a fuse 162 is preferably disposed between sensor 160 and switch 98.

As cotton materials are harvested by the harvesting structure 20, the cotton conveying duct system 26 directs the harvested cotton materials to the front upper portion of and blows the harvested materials into the basket assembly 24 in a predetermined direction. During the harvesting operation, the cotton compacting structure 60 of the present invention is in a retracted position whereat the compacting frame 62 and rotatably members or augers 64 of the compacting assembly 60 are parallel to and closely adjacent the top wall or lid 40 of the basket assembly 24.

As the harvester 10 is driven across the field, harvested cotton materials fill the basket assembly 24. Eventually, the harvested cotton materials will accumulate near the top wall or lid 40 of the basket assembly 24. It will appreciated, of course, that it is beneficial to maintain a substantially unobstructed path for the harvested cotton materials that are introduced to the basket assembly 24. To effect such ends, the operator of the harvester can either select a manual mode of operation of the cotton compacting assembly 60 or an automatic mode of operation for the cotton compacting assembly 60.

In the manual mode of operation, and through manual manipulation of the switch 98, the plunger or actuator 110 changes state from that shown to complete the cotton compacting frame enable circuit 102 thus enabling the cotton compacting control valve 94 and thereby effecting the extension of the compactor frame driver 70, thus, vertically moving the compactor frame 62 toward the floor structure 42 to compress or compact the harvested cotton materials therebeneath. In the illustrated embodiment of the invention, the number of cycles or vertical movements of the cotton compacting assembly 60 is dependent upon the time the operator holds the plunger 110 down to close the switch 98 and complete the compactor frame enable circuit 102. As an example, if the operator quickly pushes down once on the plunger 110 of switch 98 the cotton compacting frame assembly 60 and the frame 62 will cycle one time. If the operator depresses and holds the plunger 110 down through one cycle of the compacting assembly 60 and releases the plunger 110 of switch 98 at the beginning of the next or second cycle, the compacting frame assembly 60 and frame 62 will vertically reciprocate twice. Accordingly, the operator can selectively control the amount or degree of compaction of the harvested cotton materials in the basket 24.

Notably, upon manual operation of the switch 98, the auger enable circuit 100 is likewise completed and, thus, the auger control valve 92 directs pressurized hydraulic fluid to the motors 84. Since the frame 62 preferably pivots about axis 76 arranged toward the rear of the basket assembly 24, the vertical downward movement of the compacting frame 62 and the rotatable members or augers 64 will also impart a compacting movement to the harvested cotton materials toward the rear wall 36 of the basket assembly 24. As the compacting assembly 60 is moved toward its extended position, the rotatable augers 64 preferably continue to rotate and tend to move the harvested cotton materials engaged thereby toward the rear wall of the basket assembly 24.

In an automatic mode of operation, the actuator 110 of switch 98 is moved such that the movable contact 116 is manually rotated or moved from the position shown into contact with contact 118 to complete the auger enable circuit 100. Accordingly, the auger control valve 92 is actuated to allow operation of the motors 84 that continually run independent of the vertical position of the cotton compacting frame 62.

In the automatic mode of operation, the sensor 120 detects the level of harvested materials in the basket assembly 24 by monitoring the power requirements of the motors 84. As will appreciated, as the height of the harvested materials in the basket assembly 24 rise the materials will eventually impinge on the flights 82 of the auger 64 and, thus, the power requirements for rotating the motors 84 will increase. In response to a predetermined increase in pressure of the hydraulic fluid used to rotatably drive the augers 84, switch 120 closes thereby activating valve 94 and thus automatically causing vertical reciprocation of the cotton compacting frame 62 to compact the harvested cotton materials therebeneath toward the floor structure 42. As will be appreciated, compacting of the harvested materials will reduce the power requirements for the motors 84 and thus, sensor 120 may again reopen to disconnect the driver 70 frown further vertically moving the cotton compacting frame until again required and as monitored by the sensor 120.

The present invention furthermore advantageously provides the indicator apparatus 120 for yielding an indication of the level of harvested cotton materials in the basket 24. As shown, when sensor 120 closes, it enables the relay 126 thereby causing the movable contact 128 to shift into contact with contact 130. Thus, the lamp or indicator 132 in the cab region 22 (FIG. 1) of the harvester 10 provides a visual indication that the receptacle 24 is filled. Moreover, an audible alarm 134 may provide a warning of the augers 64 being stalled out over a period of time.

To discharge the harvested cotton materials from the receptacle 24, the door 46 on the receptacle 24 is opened and the conveyor assembly 50 is activated. The conveyor assembly 50 is activated under the influence of switch 144. As shown in FIG. 6 movement of the actuator 150 of switch 144 from the position shown completes the conveyor assembly enable circuit 104 thereby enabling the conveyor assembly control valve 90 which, as shown in FIG. 5, activates the conveyor assembly motor 54 to move the conveyor 52. Additionally, the conveyor assembly enable circuit 104 as shown in FIG. 6 connected to the valve 92 for controlling the rotation of the augers 64 as through the auger enable circuit 100. Thus, as the conveyor 52 of the receptacle 24 is operated, the auger 64 may likewise rotate to promote the discharge of harvested cotton materials from the basket assembly 24.

Also, during the discharge of harvested cotton materials from the basket assembly 24, switch 98 may be conditioned for manual operation of the compacting frame assembly 60. Thus, closure of switch 98 will cause the compacting frame enable circuit 102 to be completed thus resulting in the cotton compacting frame 62 to be vertically moved within the basket 24 to remove cotton materials from the side walls 38 of the receptacle 24.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A mobile cotton harvester having a cotton basket, cotton conveying duct structure including an outlet for blowing cotton materials in a preselected direction into said basket, and a cotton compacting assembly comprising:

a frame mounted in an interior of said basket for cotton compacting movements;

a member rotatably mounted on and movable with the frame, said member being configured to impart movement to the cotton materials received in the basket away from the outlet upon rotation of said member;

a motor for driving said rotatable member; and a control circuit for automatically moving said frame to compact cotton materials in response to a predetermined increase in power required to rotatably drive said member.

2. The cotton harvester according to claim 1 further including structure for mounting the frame for pivotal movement about a generally horizontal axis.

3. The cotton harvester according to claim 1 wherein said cotton compacting assembly further includes a driver for moving the frame on-the-go to push harvested cotton materials toward a floor of the basket.

4. The cotton harvester according to claim 1 wherein the axis of rotation of the rotatable member is generally parallel to the direction of the cotton materials are blown into the basket.

5. The cotton harvester according to claim 1 wherein said control circuit includes a sensor operably disposed in connection with said driven motor of the rotatable member and a driver for said frame, wherein said sensor monitors the hydraulic pressure required to drivingly rotate said driven motor for the rotatable member.

6. The cotton harvester according to claim 1 further including an apparatus for indicating when the harvested cotton materials have attained a predetermined height in the basket.

7. A cotton harvester having a cotton basket for receiving and holding harvested cotton materials, and a cotton compacting assembly comprising:

a frame mounted for cotton compacting movements in said basket;

a rotatable member carried on and movable with said frame for imparting movements to the cotton materials received in the basket;

a power driven motor for rotatably driving said member; and circuitry for automatically moving said frame to compact cotton materials in said basket in response to a predetermined increase in power requirements of the motor rotating said member.

8. The cotton harvester according to claim 7 wherein said frame is mounted toward one end of said basket for pivotal movement about a generally horizontal axis.

9. The cotton harvester according to claim 7 wherein said rotatable member is configured as an auger with flights for engaging and imparting movement to the harvested cotton materials in the basket.

10. The cotton harvester according to claim 7 wherein said circuitry allows for driven rotation of the rotatable member independently of movements of the frame.

11. The cotton harvester according to claim 7 wherein said power driven motor comprises a hydraulically driven motor operably coupled to the rotatable member.

12. The cotton harvester according to claim 7 wherein said circuitry comprises a selectively operated switch for conditioning said compacting assembly for operation in an automatic mode, wherein said frame moves in response to the power requirements of the motor, or in a manual mode, wherein the frame is moved in response to manual manipulation of the switch.

13. The cotton harvester according to claim 12 further including a driver for elevationally moving the frame within the basket, and wherein said circuitry further includes a sensor operably connected between said power driven motor and the frame driver for monitoring the power requirements of the power driven motor and controlling operation of the frame driven as a function thereof.

14. The cotton harvester according to claim 7 further including an apparatus for indicating the height of the harvested cotton materials in the basket.

15. A cotton receiving receptacle, comprising:

a walled enclosure into which harvested cotton materials are directed, said walled enclosure comprising a top wall, a floor, a series of rigid sidewalls vertically extending between said floor and top wall; and cotton compacting assembly arranged in combination with said walled enclosure, said cotton compacting assembly comprising a frame mounted for cotton compacting movements within the walled enclosure, a driver for moving said frame within said enclosure thereby compacting the harvested cotton materials in the walled enclosure, a power driven rotatable member carried on and movable with said frame for imparting movements to the harvested cotton materials received in the walled enclosure, and control circuitry for selectively controlling operation of said driver for either manual operation, wherein said driver is manually operated and said frame is moved through a cotton compacting cycle, or an automatic operation, wherein the driver is automatically operated and the frame is moved in a cotton compacting cycle in response to power requirements of said rotatable member.

16. The cotton receiving receptacle according to claim 15 wherein said power driven rotatable member comprises an elongated auger including righting for engaging and imparting movement to the harvested cotton materials received in said walled enclosure, and a motor for rotating said auger about a fixed axis.

17. The cotton receiving receptacle according to claim 15 wherein said control circuitry operates said frame driver such that said frame is normally maintained in a retracted position adjacent and generally parallel to the top wall of the enclosure.

18. The cotton receiving receptacle according to claim 15 wherein said frame driver is a linearly distendable/retractable hydraulic cylinder connected between said walled enclosure and said frame.

19. The cotton receiving receptacle according to claim 15 wherein said walled enclosure includes a lower basket portion and an upper basket portion, with said upper basket portion being elevationally movable relative to said lower basket portion.

20. The cotton receiving receptacle according to claim 15 wherein said control circuitry comprises a manually operated switch for selecting either manual or automatic operation of said cotton compacting assembly.

21. The cotton receiving receptacle according to claim 15 wherein said power driven rotatable member is driven by a hydraulic rotary motor, and wherein said control circuitry includes a sensor for monitoring the hydraulic pressure required to rotate said rotary motor.

22. The cotton receiving receptacle according to claim 15 wherein said control circuitry further includes an apparatus for cyclically controlling the vertical movements of said frame inside of said walled enclosure.

23. A cotton harvester having a cotton basket for receiving and holding harvested cotton materials, said basket including a top wall, opposed side walls and front and back walls depending from the top wall, a door through which cotton materials are discharged from the basket, and a cotton conveyor for forcibly discharging cotton materials from the basket, and a cotton compacting structure comprising:

a cotton compacting member mounted for movements in said basket;

a rotatably powered auger carried on and movable with said cotton compacting member for imparting movements to the cotton materials in the basket; and circuitry including a first switch for conjointly operating said auger and said cotton compacting member in either a manual mode, wherein said cotton compacting member is selectively moved into cotton compacting relation with the harvested cotton materials in the basket in response to manual operation of said switch, or an automatic mode, wherein said cotton compacting member is automatically moved into compacting relation relative to said harvested cotton materials in response to the power requirements of said auger, and a second switch for conjointly operating said cotton conveyor and said auger exclusive of said cotton compacting member to facilitate the discharge of harvested cotton materials from the basket.

24. The cotton harvester according to claim 23 wherein said auger is driven by a motor mounted on said cotton compacting member.

25. The cotton harvester according to claim 23 wherein said circuitry comprises electro/hydraulic circuitry comprised of a series of selected operated electrically actuated solenoid valves operably connected between a source of fluid pressure and hydraulic drivers used to rotate said auger and elevationally move said cotton compacting member.

26. The cotton harvester according to claim 23 wherein a driver is connected to and drives said auger, and wherein said circuitry further includes a pressure responsive sensor for monitoring the pressure of the hydraulic fluid directed to said motor for rotating said auger, with said pressure responsive sensor being connected to and controlling vertical movement of said cotton compacting member when said first switch is set to operate said auger and cotton compacting member in the automatic mode.

27. The cotton harvester according to claim 23 further including a linearly distendable driver connected between said basket and said cotton compacting member for moving said frame in a cotton compacting fashion, and wherein said cotton compacting member driver normally retains said cotton compacting member adjacent and generally parallel to the top wall of the basket.

28. A cotton harvester comprising harvesting structure for harvesting cotton materials from plant rows as the harvester is driven across a field, cotton conveying structure for removing the harvested cotton materials from the harvesting structure and blowing the cotton materials through an outlet into a receptacle in a predetermined direction, a power driven member carried in the receptacle for imparting movements to the cotton materials received in the receptacle away from the outlet upon rotation of the member, and an apparatus arranged remote from said receptor for indicating the level of harvested cotton materials in the receptacle as a function of the power requirements of the rotatable member.

29. A cotton receiving receptacle comprising a walled enclosure into which harvested cotton materials are directed, said walled enclosure including a top wall, a floor, a series of side walls vertically extending between said floor and said top wall, a power driven rotatable member carried in the receptacle proximate and generally parallel to said top wall for imparting movements to the harvested cotton materials in the receptacle, and an apparatus arranged outside of said receptacle for indicating the level of harvested cotton materials in the receptacle as a function of the power requirements of the rotatable member.

30. A method of filling a cotton material receiving basket arranged in combination with a cotton harvester, comprising the steps of:
   driving an auger about a rotatable axis to move cotton materials within said basket; and
   moving a cotton compacting structure on which said auger is rotatably mounted automatically between a retracted position and an extended position in response to the power requirements used to rotate said auger about said axis.

31. The method of filling a cotton material receiving basket according to claim 30 further comprising the step of sensing the power requirements used to rotate said auger about said axis.

32. The method of filling a cotton material receiving basket according to claim 30 further comprising the step of moving the compacting structure between a retracted position and an extended position in response to manual manipulation of a switch.

33. The method of filling a cotton material receiving basket according to claim 30 further including the step of mounting the cotton compacting structure for pivotal movement about a fixed generally horizontal axis.

34. The method of filling a cotton material receiving basket according to claim 30 further comprising the step of sensing the level of harvested cotton materials in the basket and operating the cotton compacting structure as a function thereof.

* * * * *